United States Patent
Troshenkin et al.

[11] 3,880,702
[45] Apr. 29, 1975

[54] FILM TYPE EVAPORATOR

[76] Inventors: Boris Alexandrovich Troshenkin, ulitsa Bairona, 177, kv. 72; Galina Ilinichna Solovieva, ulitsa Ilicha, 11/13, kv. 32; Jury Nikolaevich Piskunov, ulitsa Pyatigorskaya, 11, kv. 12; Viktor Germanovich Ponomarenko, ulitsa Sverdlova, 155, kv. 23; Ivan Mikhailovich Koval, pereulok Reshetilovsky, 14, all of Kharkov, U.S.S.R.

[22] Filed: June 29, 1973

[21] Appl. No.: 374,954

[52] U.S. Cl................. 159/13 A; 159/43; 137/599; 23/267 C
[51] Int. Cl.............. B01d 1/22; E03b ; B01d 1/00; F17d ; B01d 11/00
[58] Field of Search............... 159/13 A, 13 R, 43; 137/601, 599; 23/267 C

[56] References Cited
UNITED STATES PATENTS

| | | |
|---|---|---|
| 355,289 | 12/1886 | Yaryan ................................ 159/17 |
| 1,757,059 | 5/1930 | Rickenberg......................... 137/599 |
| 1,778,959 | 10/1930 | Petersen ............................ 159/13 A |
| 2,627,280 | 2/1953 | Adelson........................... 137/599 X |
| 2,692,606 | 10/1954 | Stepanian ....................... 137/599 X |
| 2,758,061 | 8/1956 | Geller .............................. 202/236 X |
| 2,974,680 | 5/1961 | Kreuttner............................. 137/601 |

FOREIGN PATENTS OR APPLICATIONS 65,062  10/1892  Germany ........................... 159/13 A

*Primary Examiner*—Jack Sofer

[57] ABSTRACT

A film type evaporator including a vertical heat chamber receiving therein heat transfer tubes, a distributing chamber located at the top of the evaporator, receiving therein throttling members, and a separator located at the bottom part of the evaporator. The distributing chamber is associated with an oscillator adapted to effect raising and lowering of the throttling members. A limiting baffle is mounted above the throttling members.

5 Claims, 2 Drawing Figures

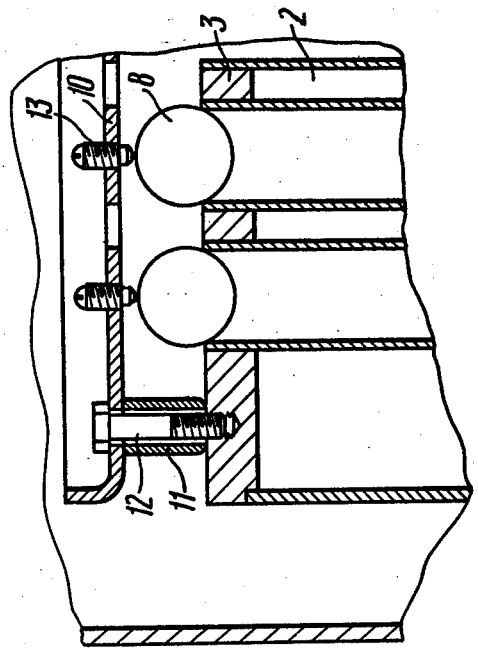
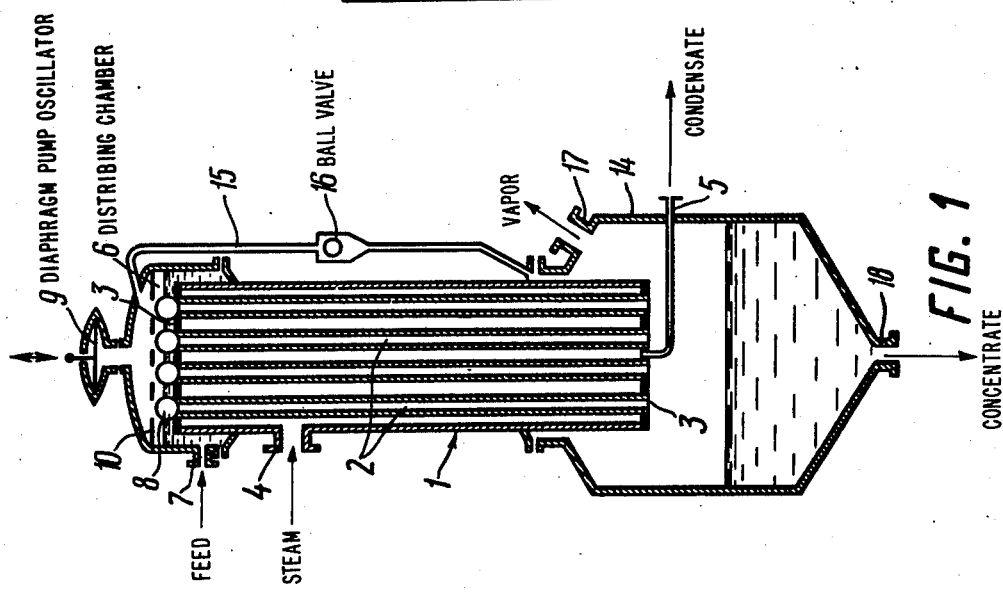

FILM TYPE EVAPORATOR

The invention relates to evaporators, and, more particularly it relates to evaporators of the internal falling film type, to be hereinafter referred to as film type evaporators.

The invention may be employed by the chemical industry, food industry, pulp-and-paper industry, aluminum and magnesium industry and in the production of sweet water.

There is known a film type evaporator (see, for example, U.S. Pat. No. 2,672,926, Class 159–13) comprising a vertically extending heating chamber receiving therein heat transfer members in the form of a plurality of tubes. The tubes are supported by plates. A distributing chamber is located in the upper part of this evaporator and is associated with a connection through which a solution to be treated is supplied thereinto. A plurality of throttling means is positioned within the distributing chamber. The throttling means are in the form of stationary tubular members received coaxially within the respective heat transfer tubes. The tubular members define annular gaps with their respective heat transfer tubes so that the solution being treated should enter the heat transfer tubes in the form of a falling film. The bottom part of the evaporator houses a separator for separating the solution being treated from the vapor being generated. The separator communicates with the bottom part of the heating chamber. A tubular conduit is provided for establishing recirculation of the solution between the separator and the distributing chamber.

However, the above described known evaporator is not free from a certain disadvantage, namely, non-uniformity of the solution among the heat transfer tubes, which has been found to affect the output of this known evaporator. This is explained by the fact that the solution is supplied into the distributing chamber about the periphery of the latter, and, as the solution flows toward the center of the evaporator, the flow resistance brought about by the successive throttling members results in a gradient of the level of the solution being established within the distributing chamber. Consequently, the heat transfer tubes located adjacent to the periphery of the evaporator have more solution falling therethrough than those located closer to the center of the evaporator.

In order to ensure complete moistening of the internal walls of the centrally located heat transfer tubes, it becomes necessary to increase the flow rate of the solution, which results in increased consumption of power, e.g. of electric power by the evaporation process.

Another disadvantage of the known apparatus is somewhat inadequate intensity of heat transfer to the falling film of the solution flowing down the heat transfer tubes, since it has been found that the film formed by the throttling means of the known evaporator is insufficiently turbulized by these means.

Furthermore, the above specified known evaporator cannot be employed for evaporation of liquors including solid particles, since in this case the gaps defined between the throttling means and the respective heat transfer tubes are liable to be clogged with these particles. This last-mentioned fact limits the field of applications of the known evaporator.

Among the disadvantages of the known evaporator is also the complicated techniques of mounting and operating the throttling means, since at mounting the means should be positioned strictly coaxially with the heat transfer tubes, and in operation the means should be periodically cleaned in case the solution being treated contains a percentage of solid particles, however small this percentage might be.

It is an object of the present invention to intensify the heat transfer process within an evaporator.

It is another object of the present invention to provide an evaporator capable of treating solutions containing solid particles.

It is still another object of the present invention to provide an evaporator featuring simplified assembling of the evaporator and reduced operating costs.

With these and other objects in view, the essence of the present invention resides in a film type evaporator including a vertically extending heating chamber accommodating therein a plurality of heat transfer tubes supported by plates, a distributing chamber located at the upper part of the evaporator and associated with a connection for supplying a solution to be treated into this chamber, the distributing chamber receiving therein throttling means adapted to define gaps through which the solution flows from the distributing chamber into the respective heat transfer tubes in the form of falling film, and a separator communicating with the bottom part of the heating chamber and with the distributing chamber, in which evaporator, in accordance with the present invention, said distributing chamber is associated with an oscillator adapted to raise and lower said throttling means, and a limiting baffle mounted above said throttling means.

It is preferable that said limiting baffle have mounted thereon adjustable abutment means for adjusting the height of raising of said throttling means.

It is further preferable that said throttling means be in the form of hollow spheres.

With an evaporator constructed in the abovedescribed manner, it becomes possible to provide for uniform distribution of the solution over the entire cross-sectional area of the evaporator, and with relatively small thickness of the falling film, as well as for uniform distributing of the solution about the internal walls of the heat transfer tubes, owing to the fact that the throttling members are in the form of spheres, and the distributing chamber is associated with an oscillator adapted to effect raising and lowering of these spheres. As the spheres always tend to self-align centrally of the inlets of the heat transfer tubes, there are defined, as said spheres are raised, annular inlet gaps of uniform width, whereby uniformity of the thickness of the film falling through all the tubular heat transfer tubes is ensured.

The incorporation in the apparatus of the adjustable abutment means for adjusting the height of raising of the throttling means ensures uniform distribution of the solution among the heat transfer tubes over the entire cross-section of the evaporator, however great the diameter of the evaporator might be, in which way the consumption of power by the oscillator is reduced.

The oscillating motion of the spheres results in turbulization of the falling film of the solution, in which way the intensity of heat transfer is increased, and any deposition of particles in the inlets of the heat transfer tubes and on the spheres themselves is positively prevented.

Thanks to the increased intensity of heat transfer, the amount of metal in the structure of the apparatus can be reduced by about 30 per cent without varying either the output, as compared with the hitherto known evaporator, or the consumption of power for the evaporation process.

Other objects and advantages of the present invention will become aparent from the following detailed description of an embodiment of the evaporator in accordance with the invention, with reference being had to the appended drawings, wherein:

FIG. 1 is a longitudinal sectional schematic view of an evaporator embodying the invention; and FIG. 2 shows an enlarged longitudinally sectional view of the distributing device of the film type evaporator embodying the invention.

Referring now in particular to the appended drawings, the film type evaporator includes a vertically extending heating chamber 1 (FIG. 1) receiving therein a plurality of heat transfer members. The latter are in the form of tubes 2 supported between a pair of tube plates 3. The heating chamber 1 is associated with an inlet connection 4 for supply of the heating medium, e.g., steam into the chamber and with an outlet connection 5 for discharge of the condensate formed. Positioned in the upper part of the evaporator is a distributing chamber 6 with an inlet connection 7 through which a solution is fed thereinto. Within the distributing chamber 6 there are throttling means in the form of hollow spheres 8 freely lying on the inlet end of each one of the tubes 2.

However, the throttling means may be in the form of a polyhedron, an ellipsoid or other body of rotation. It is only essential that when the throttling means is raised above the inlet of the respective tube, there should be defined between this throttling means and the internal wall of this tube 2 an annular gap.

The distributing chamber 6 is associated with an oscillator adapted to effect raising and lowering of the spheres 8. The oscillator in the presently described embodiment includes a diaphragm 9 associated with a drive (not shown). Alternatively, the oscillator may be in the form of a piston or a plunger extending into the distributing chamber 6 and associated with an appropriate drive.

The oscillator effects alternating raising and lowering of the spheres by periodically establishing suction within the distributing chamber 6 relative to the pressure within the tubes 2.

Alternatively, raising and lowering of spheres 8 made of a magnetizable material may be effected directly by an electromagnet.

To limit this vertical oscillation of the spheres 8 in operation of the herein disclosed evaporator, there is mounted within the distributing chamber 6 parallel to the tube plate 3 a perforated baffle 10. To support this limiting baffle 10 on the respective tube plate 3 there is provided a suitable plurality of each including a bushing 11 (FIG. 2) and a matching pin 12. The perforated baffle 10 has mounted therein a plurality of adjustable abutments selectively limiting the height of the raising of the spheres 8, in the form of set screws 13.

The bottom part of the heating chamber 1 (FIG. 1) communicates with a separator 14 effecting separation of the solution being treated from vapors of the liquid phase of this solution. The separator 14 communicates with the distributing chamber 6 via a conduit 15 incorporating a valve 16. The conduit 15 and the valve 16 are provided to effect withdrawal of the vapors of the evaporated liquid from the distributing chamber 6. In the embodiment wherein the oscillator includes a reciprocating piston or plunger, the valve 16 may be directly incorporated in this piston or plunger. The separator 14 is associated with an outlet connection 17 for withdrawing the vapors of the evaporated liquid and with another connection 18 for discharge of the solution being treated.

The herein disclosed film type evaporator operates, as follows.

Hot steam is supplied into the heating chamber 1 through the inlet connection 4. The solution being treated is fed via the inlet connection 7 into the bottom part of the distributing chamber 6, below the bottom surface of the tube plate 3. The solution is thus uniformly distributed about the perimeter of the distributing chamber 6 and over flows the tube plate 3. The spheres 8 being lowered onto the inlets of the tubes 2, the solution covers the entire tube plate 3 in a uniform layer. As the diaphragm 9 is subsequently lifted by the associated drive (not shown), the valve 16 is closed by ball valve 16 rising to its upper seat, and there is produced suction within the distributing chamber 6 relative to the pressure within the tubes 2. This makes the spheres 8 rise, whereby uniform annular gaps are formed between the spheres and the internal walls of the respective tubes 2. The solution thus enters the tubes 2 in the form of a film uniformly distributed about the internal surface of the tubes. Simultaneously, a part of the vapor generated within the tubes 2 finds its way from the tubes into the distributing chamber 6. As the diaphragm 9 is lowered, the vapor opens the valve 16 and flows through the conduit 15 into the separator 14. The separator effects separation of the solution being treated from the vapor, these two products being withdrawn, respectively, through the outlet connections 18 and 17.

The freely vertically oscillating spheres 8 provide that the film of the solution being treated flows down the tubes 2 in a pulsating manner, which results in turbulization of the falling film. Uniform distribution of the falling film of the solution about the internal surface of the tubes 2 and turbulence of this film yield effective transfer of heat to the solution being treated and evaporation of the liquid phase of this solution.

The herein disclosed evaporator may be employed for evaporation of solutions including solid impurities, because the oscillating throttling means positively prevent clogging of the gaps between themselves and the internal walls of the respective heat transfer tubes.

The herein disclosed evaporator is simple in manufacture, it is conveniently erected and operated and has a relatively small amount of metal in its structure.

What is claimed is:

1. A film type evaporator comprising: a vertically extending heating chamber; an inlet for supply of a heating medium into said heating chamber; an outlet for discharge of condensate from said heating chamber; vertical heat transfer tubes accommodated within said heating chamber; horizontal plates enclosing said heating chamber and pierced to support said heat transfer tubes at their open tubes; a closed distributing chamber adapted to distribute a solution being treated among said heat transfer tubes, said distributing chamber being located in the upper part of said evaporator; an inlet for the supply of said solution into said distributing chamber; floating throttling means accommodated in the open upper ends of said tubes and adapted, when raised off said heat transfer tubes, to define with the inlets of said heat transfer tubes a plurality of gaps for the passage of said solution through said gaps in the form of a falling film from said distributing chamber into said heat transfer tubes; a diaphragm pump oscillator connected to the distributing chamber for effecting raising and lowering of said throttling means via vacuum pressure pulsations; limiting abutment baffle means mounted above said throttling means to limit the vertical movement thereof; a separator for separation of said solution from vapor and communicating with the lower ends of the tubes; conduit means connecting said separator with said distributing chamber for conveying vapor from said distributing chamber to said separator; an outlet for withdrawing the vapor of the liquid being evaporated from said separator; an outlet for withdrawing said solution from said separator and a plurality of adjustable abutment means mounted in said limiting baffle means for selectively varying the rise of the respective throttling means.

2. A film type evaporator as claimed in claim 1, said throttling means being in the form of hollow spheres.

3. A film type evaporator as claimed in claim 1 comprising valve means in said conduit means adapted for opening when the throttling means are lowered to allow passage of vapor from the distributing chamber to said separator thru said conduit means.

4. A film type evaporator as claimed in claim 1 comprising valve means in said conduit means adapted for opening when the hollow spheres are lowered to allow passage of vapor from the distributing chamber to said separator through said conduit means.

5. A film type evaporator comprising: a vertically extending heating chamber; an inlet for supply of a heating medium into said heating chamber; an outlet for discharge of condensate from said heating chamber; vertical heat transfer tubes accommodated within said heating chamber; horizontal plates enclosing said heating chamber and pierced to support said heat transfer tubes at their open ends; a closed distributing chamber adapted to distribute a solution being treated among said heat transfer tubes, said distributing chamber being located in the upper part of said evaporator; an inlet for the supply of said solution into said distributing chamber; floating throttling means accommodated within said distributing chamber and adapted, when raised off said heat transfer tubes, to define with the inlets of said heat transfer tubes a plurality of gaps for the passage of said solution through said gaps in the form of a falling film from said distributing chamber into said heat transfer tubes; said throttling means being in the form of hollow spheres; a diaphragm pump oscillator connected to the distribution chamber for effecting raising and lowering of said throttling means via vacuum-pressure pulsations; limiting abutment baffle means mounted above said throttling means to limit the vertical movement thereof; a separator for separation of said solution from vapor and communicating with the lower ends of said tubes; conduit means connecting said separator with said distributing chamber for conveying vapor from said distributing chamber to said separator; an outlet for withdrawing the vapor of the liquid being evaporated from said separator; and an outlet for withdrawing said solution from said separator.

* * * * *